(12) United States Patent
Takeoka et al.

(10) Patent No.: US 10,784,046 B2
(45) Date of Patent: Sep. 22, 2020

(54) FILM CAPACITOR

(71) Applicant: Panasonic Intellectual Property Management Co., Ltd., Osaka (JP)

(72) Inventors: Hiroki Takeoka, Nara (JP); Tsuyoshi Ichinose, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 63 days.

(21) Appl. No.: 16/121,782

(22) Filed: Sep. 5, 2018

(65) Prior Publication Data
US 2019/0006102 A1 Jan. 3, 2019

Related U.S. Application Data

(63) Continuation of application No. PCT/JP2017/005047, filed on Feb. 13, 2017.

(30) Foreign Application Priority Data

Mar. 25, 2016 (JP) ................... 2016-061338

(51) Int. Cl.
*H01G 4/18* (2006.01)
*H01G 4/228* (2006.01)
(Continued)

(52) U.S. Cl.
CPC .............. *H01G 4/18* (2013.01); *H01G 4/005* (2013.01); *H01G 4/224* (2013.01); *H01G 4/228* (2013.01); *H01G 4/236* (2013.01); *H01G 4/38* (2013.01)

(58) Field of Classification Search
CPC .......... H01G 4/18; H01G 4/228; H01G 4/005; H01G 4/224; H01G 4/236; H01G 4/38
See application file for complete search history.

(56) References Cited

U.S. PATENT DOCUMENTS 4,163,956 A * 8/1979 Garlington ............... H01G 4/40
333/12
4,603,373 A * 7/1986 Lavene .................... H01G 4/32
361/306.1

(Continued)

FOREIGN PATENT DOCUMENTS

JP      2005277101 A  * 10/2005
JP      2007-311625     11/2007

(Continued)

OTHER PUBLICATIONS

International Search Report of PCT application No. PCT/JP2017/005047 dated Apr. 25, 2017.

*Primary Examiner* — Nathan Milakovich
(74) *Attorney, Agent, or Firm* — McDermott Will & Emery LLP

(57) ABSTRACT

A film capacitor includes a capacitor element that includes an element body formed of a winding of or a laminate of metallized films and a P pole electrode and an N pole electrode that are respectively formed on opposite end faces of the element body. The film capacitor also includes a P electrode bus bar and an N electrode bus bar that are respectively connected to the P pole electrode and the N pole electrode, and an electrically conductive covering that covers a peripheral surface of the capacitor element with the covering spaced away from at least one of the P pole electrode or the N pole electrode.

4 Claims, 7 Drawing Sheets

(51) Int. Cl.
*H01G 4/005* (2006.01)
*H01G 4/224* (2006.01)
*H01G 4/236* (2006.01)
*H01G 4/38* (2006.01)

(56) References Cited

U.S. PATENT DOCUMENTS

| | | | | |
|---|---|---|---|---|
| 5,371,650 | A | * 12/1994 | Lavene | H01G 4/224 29/25.42 |
| 2009/0059467 | A1 | 3/2009 | Grimm et al. | |
| 2018/0366270 | A1 | * 12/2018 | Raju | H01G 4/224 |

FOREIGN PATENT DOCUMENTS

| | | |
|---|---|---|
| JP | 2008-541416 | 11/2008 |
| JP | 2012-227222 | 11/2012 |

* cited by examiner

FIG.4A

| ESL/nH@1MHz | First exemplary embodiment (N electrode connected, P electrode insulated) | Second exemplary embodiment (P electrode insulated, N electrode insulated) | Conventional example (no covering) |
|---|---|---|---|
| | 10.0 | 10.2 | 17.4 |

FIG.4B

| | First exemplary embodiment (N electrode connected, P electrode insulated) | Third exemplary embodiment (P electrode connected, N electrode insulated) | Second exemplary embodiment (P electrode insulated, N electrode insulated) | Conventional example (no covering) |
|---|---|---|---|---|
| Time passed until capacitance change rate exceeded −5% (h) | 992 | 816 | 667 | 375 |

FILM CAPACITOR

BACKGROUND

1. Technical Field

The present disclosure relates to a film capacitor.

2. Description of the Related Art

A conventionally known film capacitor includes a capacitor element and lead terminals (refer to PTL 1). The capacitor element has a metallized film cylinder (element body) into which metallized films are wound, and sprayed metal parts (end face electrodes) that are respectively formed on two electrode extraction faces (end faces) of the metallized film cylinder. The lead terminals are connected to the sprayed metal parts, respectively.

CITATION LIST

Patent Literatures

PTL 1: Unexamined Japanese Patent Publication No. 2012-227222

PTL 2: Japanese Translation of PCT Publication No. 2008-541416

SUMMARY

With such a film capacitor, equivalent series inductance (ESL) exists as a series parasitic inductance component in the capacitor element. To enhance performance of the film capacitor, reduction of such ESL is required.

In another conventional film capacitor, two bus bars respectively connected to end face electrodes of a capacitor element partly overlap each other in slightly spaced relation for reduced ESL that exists in each of the bus bars (refer to PTL 2). With this film capacitor, however, ESL that exists in the capacitor element is difficult to reduce.

In view of the above problems, an object of the present disclosure is to provide a film capacitor that enables reduced ESL in a capacitor element.

A film capacitor according to a principal aspect of the present disclosure includes a capacitor element including an element body and also includes a positive (P) electrode lead terminal, a negative (N) electrode lead terminal, and an electrically conductive covering. The element body is formed of a winding of or a laminate of metallized films. The capacitor element also includes a positive (P) pole electrode and a negative (N) pole electrode that are respectively formed on opposite end faces of the element body. The P electrode lead terminal and the N electrode lead terminal are connected to the P pole electrode and the N pole electrode, respectively. The electrically conductive covering covers a peripheral surface of the capacitor element with the covering spaced away from at least one of the P pole electrode or the N pole electrode.

The present disclosure can provide the film capacitor that enables reduced ESL in the capacitor element.

Effects or significance of the present disclosure is clarified further in the following description of exemplary embodiments. However, the following exemplary embodiments are illustrative only for implementation of the present disclosure and thus are not at all restrictive of the present disclosure.

BRIEF DESCRIPTION OF THE DRAWINGS

FIG. 4A is a table showing results of a test in which ESL was measured at 1 MHz for each of the film capacitor of the first exemplary embodiment, the film capacitor of the second exemplary embodiment, and a conventional film capacitor with no covering;

FIG. 4B is a table showing results of a humidity bias test in which time passed until a capacitance change rate exceeded −5% was measured for each of the film capacitor of the first exemplary embodiment, the film capacitor of the second exemplary embodiment, the film capacitor of the third exemplary embodiment, and the conventional film capacitor with no covering;

DETAILED DESCRIPTION

The exemplary embodiments of the present disclosure are hereinafter described with reference to the drawings.

In these exemplary embodiments, positive (P) electrode bus bar 20 corresponds to "P electrode lead terminal" described in the claims, and negative (N) electrode bus bar 30 corresponds to "N electrode lead terminal" described in the claims.

It is to be noted that the above description is intended for structural correspondence between the claims and each of the exemplary embodiments, so that the above-described correspondences do not limit the present disclosure described in the claims to respective structures of the exemplary embodiments at all.

First Exemplary Embodiment

Figure 1A:
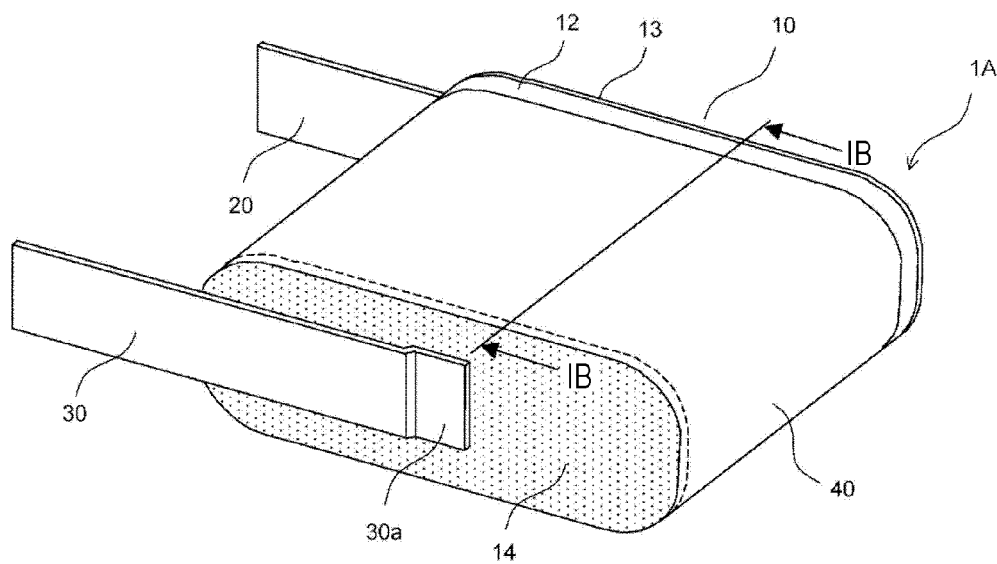
FIG. 1A is a perspective view of a film capacitor according to a first exemplary embodiment.
Figure 1B:
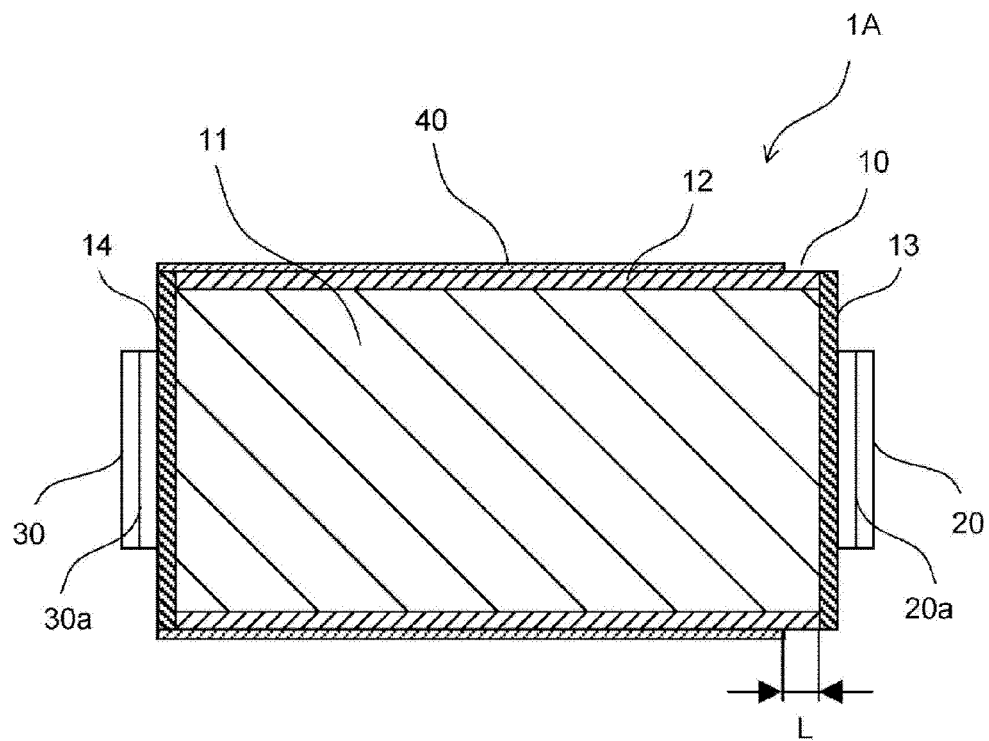
FIG. 1B is a vertical section of the first exemplary embodiment's film capacitor taken along line IB-IB of FIG. 1A.

FIG. 1A is a perspective view of film capacitor 1A according to the first exemplary embodiment, and FIG. 1B is a vertical section of the first exemplary embodiment's film capacitor 1A taken along line IB-IB of FIG. 1A.

Film capacitor 1A includes capacitor element 10, P electrode bus bar 20, N electrode bus bar 30, and covering 40.

Capacitor element 10 has the shape of a flattened cylinder of elliptic cross-section and includes element body 11, exterior film 12, P pole electrode 13, and N pole electrode 14.

Element body 11 is formed by stacking of two metallized films that each have, on a dielectric film, vapor deposited metal as an internal electrode, and winding or overlaying of the stacked metallized films. Given examples of a material for the dielectric film include polypropylene (PP), polyethylene terephthalate (PET), and polyethylene naphthalate (PEN). Given examples of the metal to vapor deposit include aluminum, zinc, magnesium, and an alloy of these metals.

Exterior film 12 is wound a plurality of times (a plurality of turns) around a peripheral surface of element body 11. In this way, the peripheral surface of element body 11 is covered with exterior film 12 in multilayered form. By being protected by exterior film 12, element body 11 is prevented, for example, from being damaged or broken. Given examples of a material for exterior film 12 include PP, PET, and PEN that are the same as the given examples of the material for the dielectric film.

Opposite end faces of element body 11 are sprayed with metal, thus being formed with P pole electrode 13 and N pole electrode 14, respectively. Given examples of the metal to spray include aluminum, zinc, and magnesium. For improved contact between element body 11 and P pole electrode 13 as well as between element body 11 and N pole electrode 14, the above-mentioned vapor deposited metal on the dielectric film is structurally thicker at its edge touching P pole electrode 13 or N pole electrode 14 than at its other part (this structure is hereinafter referred to as "heavy edge structure").

P electrode bus bar 20 is formed of, for example, an electrically conductive material such as copper and has the shape of a long plate. P electrode bus bar 20 has, at its one end, electrode connection part 20a that is electrically connected to a central part of P pole electrode 13 by a connection method such as soldering. P electrode bus bar 20 has a shoulder between electrode connection part 20a and its other part, so that its other part does not touch P pole electrode 13. Similarly to P electrode bus bar 20, N electrode bus bar 30 is formed of, for example, an electrically conductive material such as copper and has the shape of a long plate. N electrode bus bar 30 has, at its one end, electrode connection part 30a that is electrically connected to a central part of N pole electrode 14 by a connection method such as soldering. N electrode bus bar 30 has a shoulder between electrode connection part 30a and its other part, so that its other part does not touch N pole electrode 14.

Covering 40 is formed of an electrically conductive material to be sheet-shaped and is mounted to a peripheral surface of capacitor element 10 to cover this peripheral surface. Covering 40 touches N pole electrode 14 (a peripheral face of N pole electrode 14) and is spaced only predetermined insulation distance L, e.g., 5 mm away from P pole electrode 13 (a peripheral face of P pole electrode 13). Covering 40 is formed, for example, as a so-called aluminum foil tape having an adhesive applied as a backing of aluminum foil. A material for covering 40 is not limited to the aluminum foil and may be, for example, iron foil or stainless foil.

In cases where covering 40 is affixed to the peripheral surface of capacitor element 10 by an adhesive as with the aluminum foil tape, covering 40 touches N pole electrode 14 via the adhesive. The adhesive is a very thin layer, thus not blocking electrical connection between covering 40 and N pole electrode 14. It is to be noted that an electrically conductive adhesive may be used for better electrical connection between covering 40 and N pole electrode 14.

Second Exemplary Embodiment

Figure 2A:
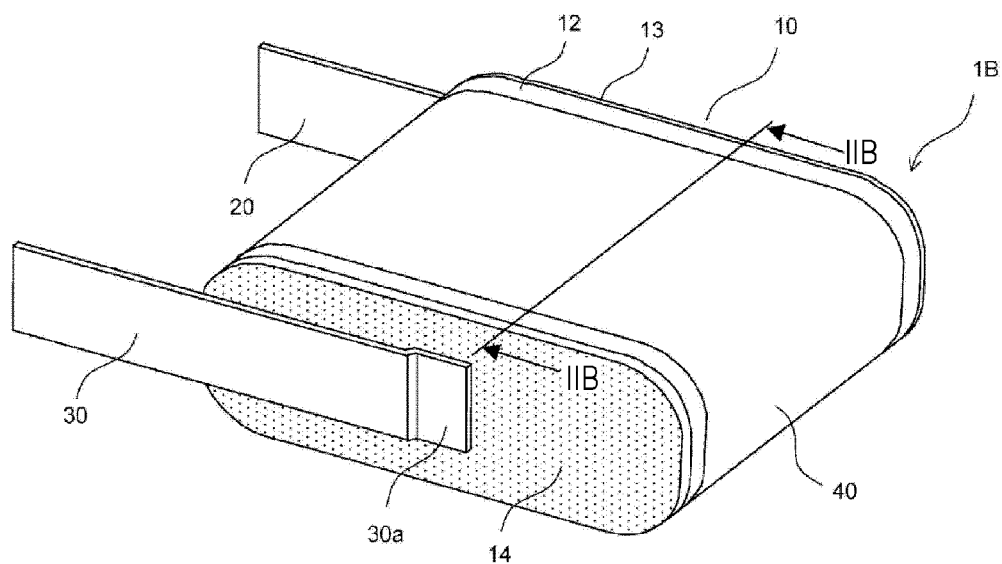
FIG. 2A is a perspective view of a film capacitor according to a second exemplary embodiment.
Figure 2B:
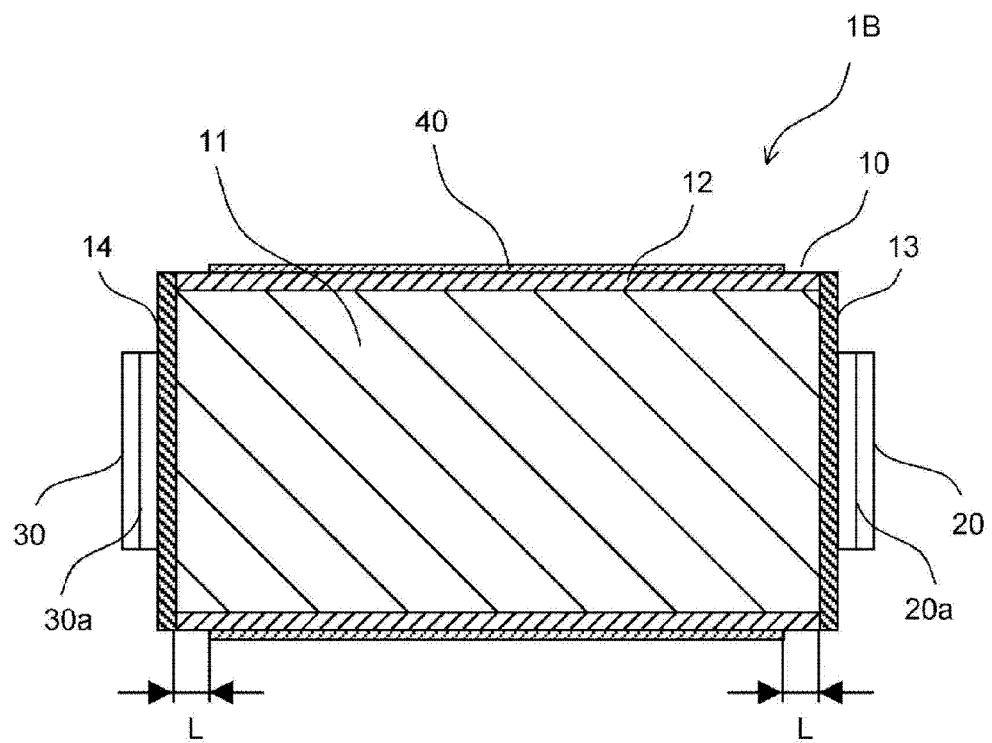
FIG. 2B is a vertical section of the second exemplary embodiment's film capacitor taken along line IIB-IIB of FIG. 2A.

FIG. 2A is a perspective view of film capacitor 1B according to the second exemplary embodiment, and FIG. 2B is a vertical section of the second exemplary embodiment's film capacitor 1B taken along line IIB-IIB of FIG. 2A.

With film capacitor 1B of the present exemplary embodiment, covering 40 covers the peripheral surface of capacitor element 10 while being spaced only predetermined insulation distance L, e.g. 5 mm away from both P pole electrode 13 and N pole electrode 14. Film capacitor 1B is otherwise structurally similar to film capacitor 1A of the first exemplary embodiment.

Third Exemplary Embodiment

Figure 3:
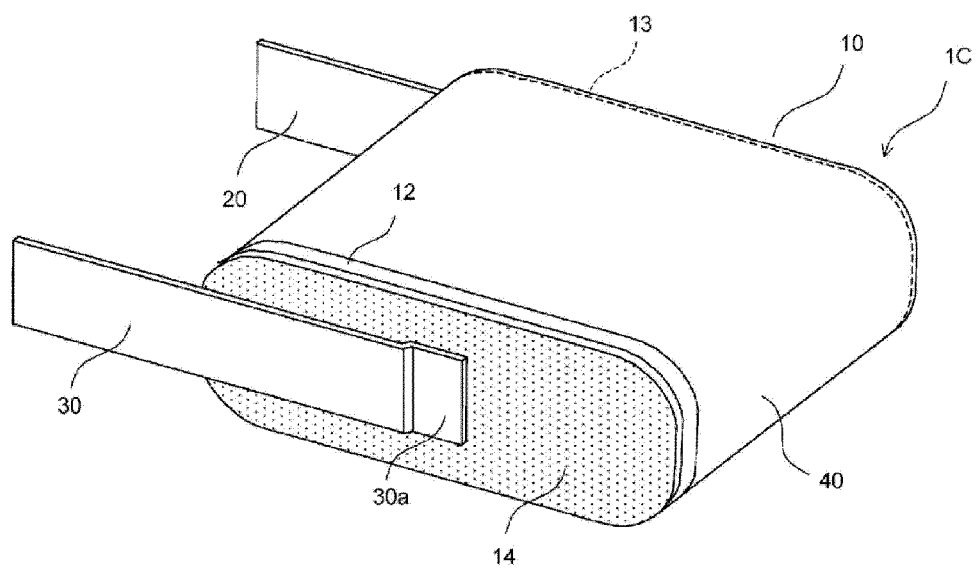
FIG. 3 is a perspective view of a film capacitor according to a third exemplary embodiment.

FIG. 3 is a perspective view of film capacitor 1C according to the third exemplary embodiment.

With film capacitor 1C of the present exemplary embodiment, covering 40 covers the peripheral surface of capacitor element 10 while touching P pole electrode 13 and being spaced only predetermined insulation distance L, e.g. 5 mm away from N pole electrode 14. Film capacitor 1C is otherwise structurally similar to film capacitor 1A of the first exemplary embodiment.

<Effects of Exemplary Embodiments>

FIG. 4A is a table showing results of a test in which ESL was measured at 1 MHz for each of film capacitor 1A of the first exemplary embodiment, film capacitor 1B of the second exemplary embodiment, and a conventional film capacitor without covering 40. A unit of ESL is nH. The smaller this value, the smaller a voltage fluctuation can be in a circuit in which a film capacitor is incorporated.

The ESL measurement test was conducted using an Impedance Analyzer 4294A that is manufactured by Agilent Technologies, Ltd. along with, as an interface, a 16047 test fixture that is also manufactured by Agilent Technologies, Ltd. Each of the film capacitors had a capacitance of 130 μF and an electrode-to-electrode distance of 60 mm. Covering 40 of film capacitor 1A was spaced a distance of 5 mm away from P pole electrode 13, and covering 40 of film capacitor 1B was spaced a distance of 5 mm away from P pole electrode 13 and N pole electrode 14. ESL values shown in the table of FIG. 4A are each an average of respective values of five film capacitors of the same structure.

As shown the results of the ESL measurement test in FIG. 4A, respective electrically conductive coverings 40 of film capacitor 1A of the first exemplary embodiment and film capacitor 1B of the second exemplary embodiment can reduce ESL that exists in capacitor element 10 by covering the peripheral surface of capacitor element 10.

As is obvious even from the results of the ESL measurement test, such reduction of the ESL in capacitor element 10 takes place conceivably because a magnetic field is generated in covering 40 in such a direction as to cancel a magnetic field change effected by flow of current into capacitor element 10 and induces a current to flow through covering 40.

Although not shown in the results of the ESL measurement test, reduction of ESL in capacitor element 10 can be expected even with film capacitor 1C of the third exemplary embodiment as with respective film capacitors 1A and 1B of the first and second exemplary embodiments.

FIG. 4B is a table showing results of a humidity bias test conducted on film capacitor 1A of the first exemplary embodiment, film capacitor 1B of the second exemplary embodiment, film capacitor 1C of the third exemplary embodiment, and the conventional film capacitor without covering 40. This humidity bias test was intended for measurement of time that passes until a capacitance change rate exceeds −5% (time that is taken until capacitance decreases by 5%) during continuous 750 V voltage application under such conditions that temperature is 85° C., and relative humidity is 85% r.h. The longer the time that passes until the capacitance change rate exceeds −5%, the more superior humidity resistance can be.

With film capacitor 1C of the third exemplary embodiment, conditions for capacitor element 10 were such that capacitance was 130 μF, an electrode-to-electrode distance was 60 mm, and covering 40 was spaced a distance of 5 mm away from N pole electrode 14. Conditions for capacitor element 10 of each of the other film capacitors were the same as those in the above-described ESL measurement test. In the table of FIG. 4B, a value of time passed until the capacitance change rate exceeded −5% is an average of values of three film capacitors of the same structure.

As shown in the results of humidity bias test of FIG. 4B, respective film capacitors 1A, 1B, and 1C of the first through third exemplary embodiments that each have covering 40 can have improved humidity resistances compared with the conventional film capacitor without covering 40 (humidity-resistant effect 1).

Moreover, film capacitor 1A that has covering 40 touching N pole electrode 14 and the third exemplary embodiment's film capacitor 1C that has covering 40 touching P pole electrode 13 can have the improved humidity resistances compared with the second exemplary embodiment's film capacitor 1B that has covering 40 spaced away from both P pole electrode 13 and N pole electrode 14 (humidity-resistant effect 2).

Furthermore, film capacitor 1A that has covering 40 touching N pole electrode 14 can have the improved humidity resistance compared with the third exemplary embodiment's film capacitor 1C that has covering 40 touching P pole electrode 13 (humidity-resistant effect 3).

As is obvious even from the results of the humidity bias test, humidity-resistant effect 1 described above is assumed to be due to suppression of external-moisture infiltration into element body 11 through exterior film 12 by covering 40. External moisture enters element body 11 mainly through a slight clearance in a contact interface between P pole electrode 13 and element body 11 as well as between N pole electrode 14 and element body 11. With film capacitors 1A and 1C, a contact interface between N pole electrode 14 and element body 11 and a contact interface between P pole electrode 13 and element body 11 are each covered by covering 40; otherwise these contact interfaces might be weak spots, admitting moisture infiltration. As such, a test result such as above-described humidity-resistant effect 2 is assumed to have been obtained.

Above-described humidity-resistant effect 3 is assumed to be due to the following reason.

Decrease in capacitance due to moisture infiltration into capacitor element 10 largely depends on loss of a positive-pole-end (P-pole-end) internal electrode as a result of anodic oxidation. With film capacitor 1C that has covering 40 touching P pole electrode 13, external moisture infiltrates into capacitor element 10 through an N-pole-end part where covering 40 is absent. The moisture thus infiltrating through the N-pole-end part causes, near N pole electrode 14, anodic oxidation to the internal electrode that is connected to P pole electrode 13, thus causing a decrease in capacitance.

With film capacitor 1A, on the other hand, although moisture infiltrating through a P-pole-end part may cause, near P pole electrode 13, anodic oxidation to the internal electrode connected to P pole electrode 13 for a reason similar to the above reason, the vapor deposited metal has the heavy edge structure near P pole electrode 13 where the vapor deposited metal is thicker than at its other part. Accordingly, functioning of the vapor deposited metal as the internal electrode is conceivably unlikely to deteriorate.

As such, film capacitor 1A can have the improved humidity resistance compared with film capacitor 1C, and a test result such as above-described humidity-resistant effect 3 is assumed to have been obtained.

It is to be noted that with respective film capacitors 1A, 1B, and 1C of the first through third exemplary embodiments, covering 40 are spaced away from at least one of P pole electrode 13 or N pole electrode 14, so that covering 40 can prevent a short between P pole electrode 13 and N pole electrode 14.

<Modifications>

The exemplary embodiments of the present disclosure have been described above but are not restrictive of the present disclosure. The present disclosure admits of application examples with various modifications other than the above exemplary embodiments.

Figure 5:
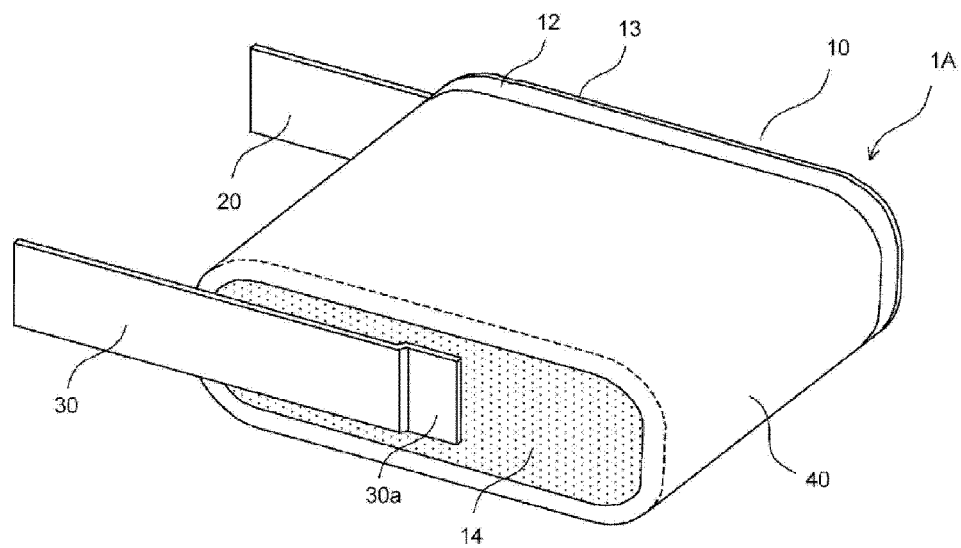
FIG. 5 is a perspective view of a film capacitor according to a modification.

In the first exemplary embodiment, for example, covering 40 touches the peripheral face of only N pole electrode 14. However, covering 40 may extend over to a surface of N pole electrode 14 to touch a peripheral border of that surface as illustrated in FIG. 5. In this way, covering 40 can touch a wider area of N pole electrode 14.

Figure 6:
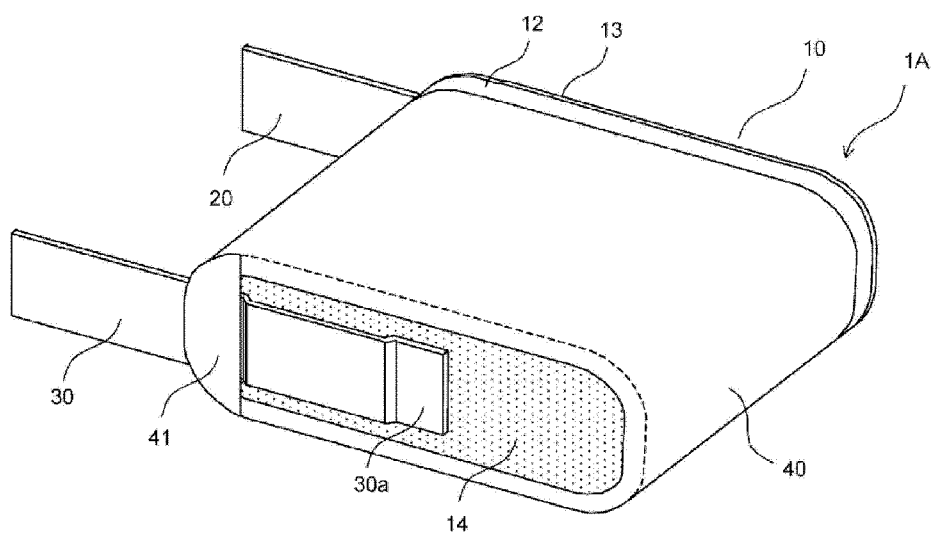
FIG. 6 is a perspective view of a film capacitor according to another modification.

Moreover, in cases where covering 40 extends over to the surface of N pole electrode 14, a structure such as illustrated in FIG. 6 may be adopted. In this structure, N electrode bus bar 30 is formed of the same material as covering 40, such as aluminum foil, is covered with covering piece 41, which is a part of covering 40, at the peripheral border of the surface of N pole electrode 14 and touches the peripheral border of N pole electrode 14. In this case, it is to be noted that as illustrated in FIG. 6, N electrode bus bar 30 is reshaped to touch the peripheral border of N pole electrode 14. With such a structure, current flowing through N electrode bus bar 30 flows into capacitor element 10 through the peripheral border of N pole electrode 14 that touches N electrode bus bar 30, so that a current loop between film capacitor 1A and a circuit in which film capacitor 1A is incorporated becomes shorter, and inductance can be reduced accordingly.

It is to be noted that the modifications in FIG. 5 and FIG. 6 can also be applied to film capacitor 1C of the third exemplary embodiment.

Figure 7:
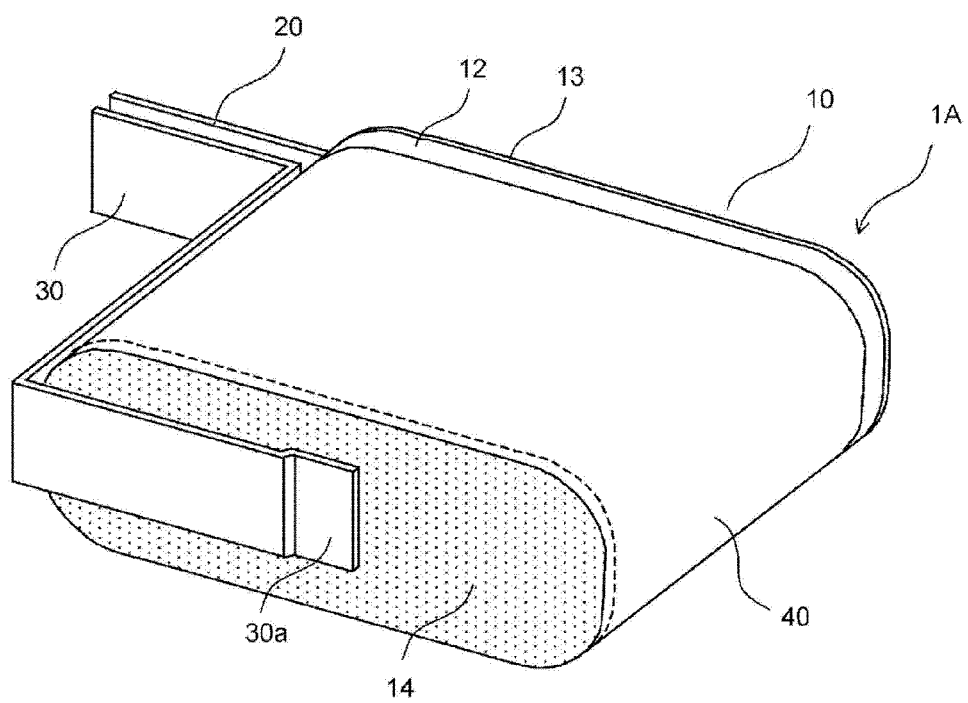
FIG. 7 is a perspective view of a film capacitor according to yet another modification.

In the structure described in the first exemplary embodiment, P electrode bus bar 20 and N electrode bus bar 30 may partly overlap in slightly spaced relation as illustrated in FIG. 7. Such structure enables reduction of ESL in each of P electrode bus bar 20 and N electrode bus bar 30. It is to be noted that this modification can also be applied to film capacitor 1B of the second exemplary embodiment and film capacitor 1C of the third exemplary embodiment.

In each of the above first exemplary embodiment and the others, P electrode bus bar 20 and plate-shaped N electrode bus bar 30 that are plate-shaped are respectively connected to P pole electrode 13 and N pole electrode 14 of capacitor element 10. However, this is not limiting. A P electrode lead wire terminal and an N electrode lead wire terminal that are not plate-shaped, but each have the shape of a round bar may be connected to P pole electrode 13 and N pole electrode 14, respectively.

The exemplary embodiments of the present disclosure are susceptible of other various modifications where appropriate within the scope of technical concepts described in the claims.

The present disclosure is useful in manufacturing film capacitors that are used in various types of electronic devices, electric devices, industrial equipment, electrical equipment for vehicles, and others.

What is claimed is:

1. A film capacitor comprising:
a capacitor element including an element body that is formed of a winding of a metallized film or a laminate of metallized films, a positive (P) pole electrode, and a negative (N) pole electrode, the P pole electrode and the N pole electrode being respectively formed on opposite end faces of the element body;
a positive (P) electrode lead terminal connected to the P pole electrode;
a negative (N) electrode lead terminal connected to the N pole electrode; and
a covering that is electrically conductive and covers a peripheral surface of the capacitor element with the covering spaced away from at least one of the P pole electrode or the N pole electrode, wherein
the P pole electrode covers entirely one end face of the element body, and the N pole electrode covers entirely the other end face of the element body,
the covering directly contacts one of the P pole electrode and the N pole electrode at an outermost edge of the one of the P pole electrode and the N pole electrode, and is spaced away from another one of the P pole electrode and the N pole electrode.

2. The film capacitor according to claim 1, wherein the covering touches the N pole electrode and is spaced away from the P pole electrode.

3. The film capacitor according to claim 1, wherein:
the covering extends over to a surface of the one of the P pole electrode and the N pole electrode; and
a lead terminal corresponding to the one of the P pole electrode and the N pole electrode among the P electrode lead terminal and the N electrode lead terminal is covered by the covering at a peripheral part of the surface to touch the one of the P pole electrode and the N pole electrode.

4. The film capacitor according to claim 1, wherein the covering comprises aluminum foil.

* * * * *